United States Patent [19]
Carmichael

[11] Patent Number: 6,125,776
[45] Date of Patent: Oct. 3, 2000

[54] DEVICE FOR DIGGING PLANTING HOLES FOR BEDDING PLANTS AND THE LIKE

[76] Inventor: Daniel J. Carmichael, 5998 Pleasant Dr., Waterford, Mich. 48329

[21] Appl. No.: 09/056,405

[22] Filed: Apr. 7, 1998

Related U.S. Application Data

[60] Provisional application No. 60/043,389, Apr. 7, 1997, and provisional application No. 60/055,685, Sep. 29, 1997.

[51] Int. Cl.[7] .................................................. A01B 35/28
[52] U.S. Cl. .......................... 111/113; 111/116; 172/111; 30/500
[58] Field of Search ........................... 111/116, 115, 113, 111/100; 30/500, DIG. 7; 172/25, 111, 123

[56] References Cited

U.S. PATENT DOCUMENTS

| | | | |
|---|---|---|---|
| 1,857,383 | 5/1932 | Johnson | 30/DIG. 7 X |
| 1,866,073 | 7/1932 | Aberle | 30/DIG. 7 X |
| 2,991,838 | 7/1961 | Lane . | |
| 3,814,189 | 6/1974 | Thompson | 30/DIG. 7 X |
| 3,905,103 | 9/1975 | Ford et al. | 30/DIG. 7 X |
| 4,122,784 | 10/1978 | Joswig | 111/116 |
| 4,901,800 | 2/1990 | Wilson | 111/116 X |
| 5,113,952 | 5/1992 | Niewold et al. . | |
| 5,133,269 | 7/1992 | Charneski | 111/116 |
| 5,242,024 | 9/1993 | Van Houten | 30/DIG. 7 X |
| 5,464,067 | 11/1995 | Dulak | 30/DIG. 7 X |
| 5,862,658 | 1/1999 | Howard | 30/500 X |

FOREIGN PATENT DOCUMENTS

| 1027455 | 4/1958 | Germany | 111/116 |
|---|---|---|---|

*Primary Examiner*—Christopher J. Novosad
*Attorney, Agent, or Firm*—John R Benefiel

[57] ABSTRACT

A device for digging holes for setting out bedding plants, including a rotary tool for digging a hole, the tool having a shank adapted to be chucked to a power drill and passing through an inverted bowl shaped transparent plastic cover to contain excavated soil and dispose the same in an annular mound, for ready repacking of the soil around the plant roots. A limit stop arrangement limits the extent of advance through the cover which rests on the ground during the use of the device, so as to set the hole depth. The tool has a flat bladed digging portion forming a flat bottomed hole.

11 Claims, 2 Drawing Sheets

DEVICE FOR DIGGING PLANTING HOLES FOR BEDDING PLANTS AND THE LIKE

CROSS-REFERENCE TO RELATED APPLICATION

This application claims the benefit of provisional application U.S. Serial No. 60/043,389, filed on Apr. 7, 1997, 60/055,685 filed on Sep. 29, 1997.

BACKGROUND OF THE INVENTION

This invention concerns tools and devices for digging small holes for planting purposes.

It has heretofore been known to use augers for planting tulip bulbs, the augers driven by power drills to reduce the labor involved in planting bulbs when setting out large number of these. See U.S. Pat. Nos. 4,901,800 and 5,113,952 as examples of such use of an auger.

Augers are relatively expensive and are not readily available in larger sizes suited to planting bedding plants, i.e., 2–4 inches. Bedding plants are also set out in large numbers such that a labor and time saving device for digging holes would also be desirable for these. A more elaborate device is shown in U.S. Pat. No. 2,991,838 for digging larger holes.

Another desirable feature of a device for digging holes for bedding plants would be the containment of the excavated soil, in order to conveniently allow for refilling of the soil around the plant set into the hole, and to avoid scattering of the soil into any surrounding mulch material.

It would also be important in mass planting of flowers to provide a convenient and rapid way for achieving a uniform hole depth and spacing, as well as a hole contour that would avoid air pockets to enhance the root growth of the plants set into the hole.

It is an object of the present invention to provide a simple, low cost device effective for excavating large numbers of small holes of a controlled uniform spacing and depth.

It is another objection of the invention to provide such a device which is capable of containing the soil removed from the hole during digging such as to prevent scattering and position the same for replacing the soil around the roots of the bedding plant.

SUMMARY OF THE INVENTION

These and other objects of the present invention are achieved by a spade type digging tool having a shank which may be rotated by a drill motor, with a flat blade attached to the shank used to excavate the hole. The blade is preferably square bottomed to produce a flat bottomed hole.

An open bottomed inverted bowl shaped cover has a tubular upper portion through which the tool shank passes, and over which is received a stop tube with a spring interposed. The cover is positioned on the ground surface and the tool is advanced as the hole is dug until the stop tube bottoms against the shield cover, setting the hole depth.

The shielding cover is transparent to allow the hole location to be viewed prior to rotating the tool, and functions to confine the soil in a ring around the hole. The soil is thus prevented from being scattered about, and is packed in a ring around the hole, to be in convenient position for repacking around the roots of the plant.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
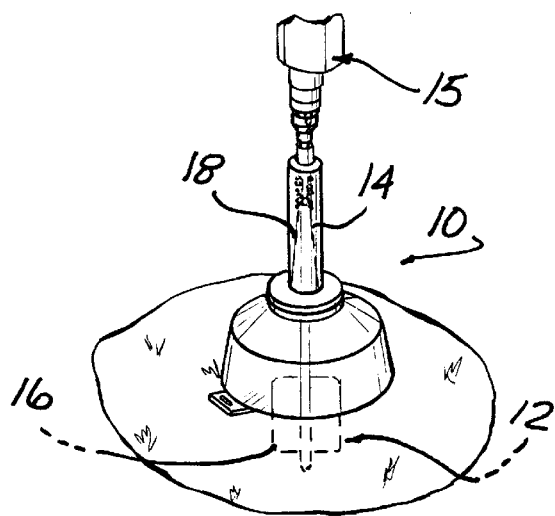
FIG. 1 is a perspective view of the device according to the invention in use.
Figure 2:
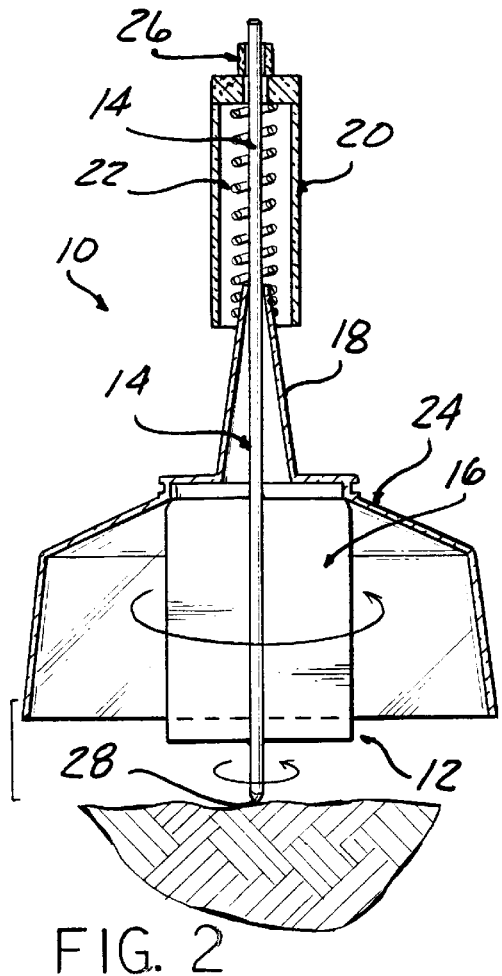
FIG. 2 is an enlarged longitudinal sectional view of the device in position to begin digging a hole.
Figure 3:
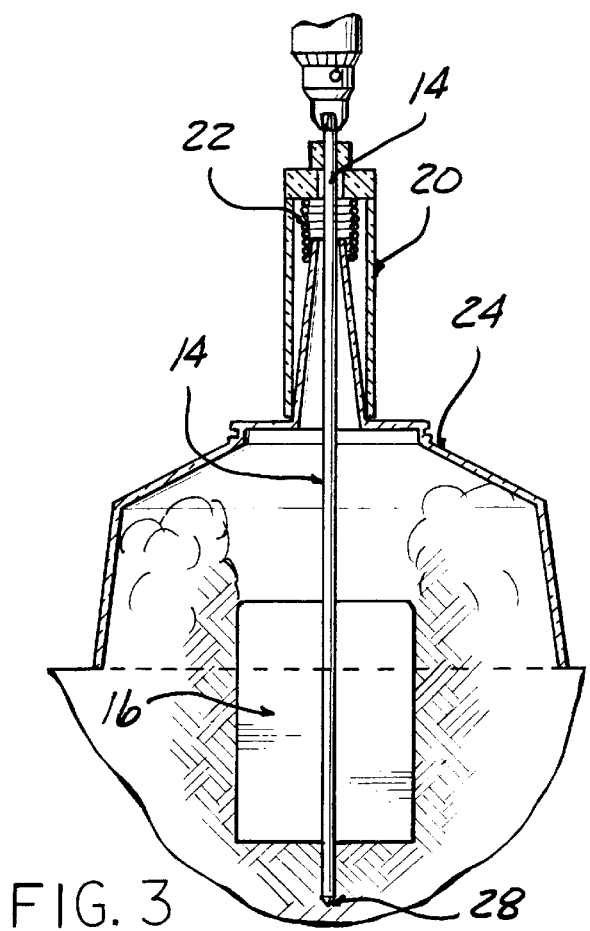
FIG. 3 is an enlarged longitudinal sectional view of the device after the tool has advanced to full depth.
Figure 5A:
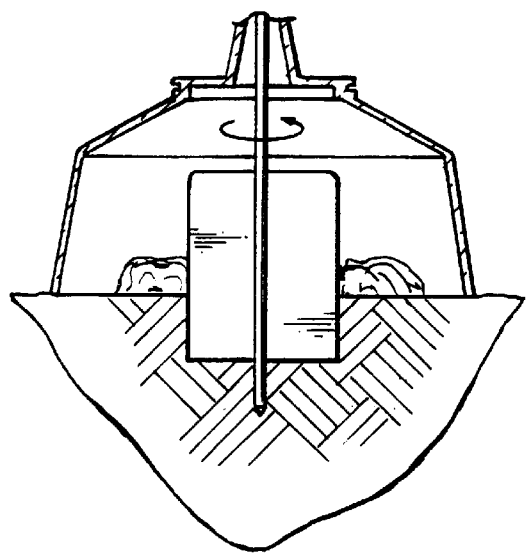
FIGS. 5A–5C are diagrammatic views showing the steps of planting a bedding plant using the present invention.
Figure 5B:
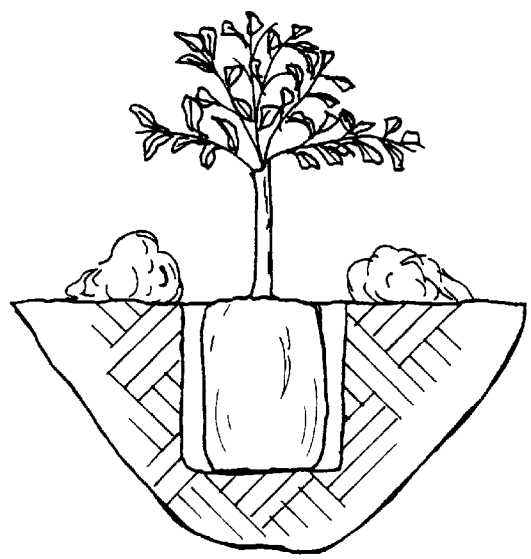
Figure 5C:
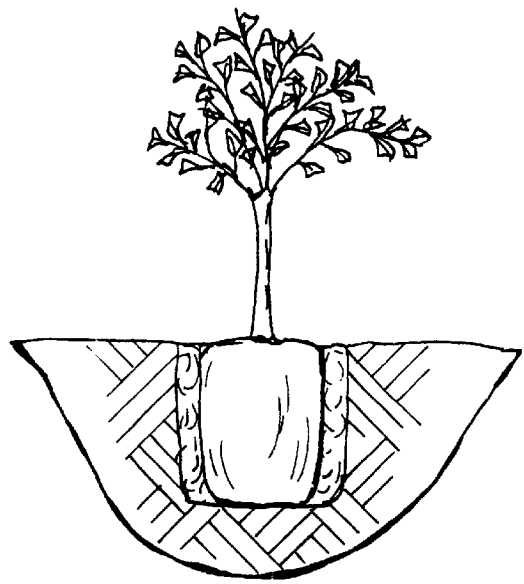

Referring to the drawings, and particularly FIGS. 1–3, the device 10 according to the invention includes a spade tool 12 having a shank 14 adapted to be chucked in a hand held drill as shown, so as to enable powered rotation of a square shaped blade 16 fixed to the shank 14. A larger diameter inverted bowl shaped cover 24, preferably of clear plastic, has a tubular extension 18 through which the shank 14 passes so as to be movable in and out therein.

A stop tube 20 is received over the upper end of the shank 14 and a spring 24 is interposed between the cover extension 18 and the stop tube 20 to urge the same apart and the stop tube 20 against a fixed ring 26 on the shank 14, in the position shown in FIG. 2.

The shank 14 extends beyond the blade 16 to a pointed end 28 to act to pilot the advance of the blade 16 into the ground at a selected hole location.

The transparency of the cover 24 allows viewing of the shank end 28 to properly locate the location of the hole to be dug.

As the rotating blade 16 advances, the excavated soil is confined by the cover 24 as shown in FIG. 3, packing in an annular mound around the hole as shown.

The stop tube 20 advances down the shank 14, eventually bottoming out against the top of the cover 24, setting the maximum extent of movement of the shank 14 in extension 18, and thereby the maximum depth of the hole excavated.

The square shape of the blade 16 creates a flat bottomed hole to avoid air pockets below the plant, and the annular mound of soil can be easily pressed back around the plant roots, perhaps leaving a slight raised ring to capture water.

Figure 4:
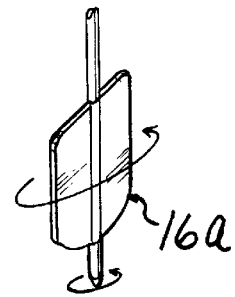
FIG. 4 is a perspective view of an alternative tool shape.

A rounded blade 16A can also be used as shown in FIG. 4, where a rounded hole bottom is desired.

Also, the device could utilize an auger as the digging tool, although an auger would not be preferred since the soil displacement pattern produced by an auger is not as advantageous as the blade shape as described above.

What is claimed is:

1. A device for digging a hole for planting a plant at a selected location in a ground area, comprising:
    a rotary digging tool having a shank and a digging portion connected to said shank, said digging portion when rotated excavating soil from said ground area location to form a hole, said excavated soil directed onto said ground area adjacent said hole by action of said digging portion;
    an inverted bowl shaped cover, said shank passing through an opening in said cover and having an end protruding out above said cover and adapted to be chucked to a power drive for rotation thereof, said shank able to be moved axially in and out within said cover opening, said digging portion of said tool advanced into the ground as said shank moves into said cover with said cover resting on said ground area to have a hole excavated therein; and, said cover comprising an annular confinement for said soil excavated by said tool digging portion and deposited on said soil area to thereby form an annular mound of soil surrounding said hole.

2. The device according to claim 1 wherein said cover is constructed of a transparent plastic material.

3. The device according to claim 1 further including limit stop means limiting the extent of movement of said shank into said cover, whereby said stop means acts to limit the depth of advance of said digging tool digging portion into the ground.

4. The device according to claim 3 wherein said limit stop means includes a stop tube received over said shank and having an upper end held at a predetermined axial location on said shank, a lower end abutting against said cover when said shank moves into said cover to said extent limited by said stop means.

5. The device according to claim 4 further including a spring compressed between said stop tube upper end and said cover resisting broad movement of said shank.

6. The device according to claim 5 wherein said cover has a tubular extension formed with said cover opening extending up into said stop tube.

7. The device according to claim 1 wherein said digging tool includes a flat blade attached to said shank.

8. The device according to claim 7 wherein said shank has a pointed end extending past said flat blade.

9. The device according to claim 8 wherein said flat blade has a straight bottom edge extending perpendicularly to said shank.

10. The device according to claim 9 wherein said flat blade has a rounded bottom edge.

11. A method of planting a bedding plant in the soil at a selected location of a ground area, comprising the step of rotating a flat bladed tool while advancing said tool into the ground to excavate a hole of predetermined depth in the soil at said ground area location by causing said soil to be thrown out of said hole as said tool is rotated and advanced into the soil at said ground area location;

confining said soil thrown from said hole by positioning an inverted bowl shaped cover on said ground area location and over said hole while rotating said tool to cause an annular mound of said soil to be formed, immediately surrounding said hole; setting said plant in said hole after removal of said tool; and, packing the excavated soil in said annular mound back into said hole and around roots of said plant.

\* \* \* \* \*